(12) United States Patent
Sato et al.

(10) Patent No.: US 6,894,959 B2
(45) Date of Patent: May 17, 2005

(54) METHOD AND APPARATUS FOR EXPOSING OPTICAL DISK MASTER

(75) Inventors: Shuji Sato, Neyagawa (JP); Shinya Abe, Kadoma (JP); Morio Tomiyama, Ikoma (JP); Masahiko Tsukuda, Suita (JP); Eiichi Ito, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 476 days.

(21) Appl. No.: 10/227,625

(22) Filed: Aug. 22, 2002

(65) Prior Publication Data

US 2003/0058755 A1 Mar. 27, 2003

(30) Foreign Application Priority Data

Aug. 23, 2001 (JP) ........................................ 2001-252318

(51) Int. Cl.$^7$ ................................................. G11B 7/00
(52) U.S. Cl. .............................. 369/44.41; 369/44.37; 369/44.28; 369/53.23
(58) Field of Search ........................... 369/44.41, 44.37, 369/44.27, 44.28, 44.32, 44.25, 47.1, 53.1, 53.15, 53.23, 112.01

(56) References Cited

U.S. PATENT DOCUMENTS 5,579,298 A * 11/1996 Opheij et al. .......... 369/112.04
5,859,819 A * 1/1999 Miyabe et al. .......... 369/44.41

\* cited by examiner

Primary Examiner—Muhammad Edun
(74) Attorney, Agent, or Firm—Merchant & Gould P.C.

(57) ABSTRACT

A method for exposing an optical disk master includes rotating a substrate disk coated with a photoresist, focusing a beam on the photoresist for exposure through an objective lens, and exposing the photoresist so as to form tracks on the substrate disk in its circumferential direction. At this time, the beam is deflected at least temporarily by passing through a deflector. The beam is divided into a first beam and a second beam after passing through the deflector, and the first beam is focused on the photoresist. A difference between the current position and the target position of an optical path of the second beam is detected, and the deflection operation of the deflector is corrected based on the difference so that the optical path of the second beam is located at the target position. This method can improve the track pitch accuracy of an optical disk having a narrow track pitch.

14 Claims, 8 Drawing Sheets

METHOD AND APPARATUS FOR EXPOSING OPTICAL DISK MASTER

BACKGROUND OF THE INVENTION

1. Field of the Invention

The present invention relates to a method and apparatus for exposing an optical disk master.

2. Description of the Related Art

With a growing amount of information needed for information processing equipment and image/acoustic equipment, optical disks have attracted considerable attention in recent years because they are excellent in easy data access, mass storage, and miniaturization of the equipment. There are three types of optical disks: read-only type, write-once type, and recording/reproducing type. Examples of the recording/reproducing type include a phase change optical disk and a magneto-optical disk. These disks are called CD, DVD, MO, or the like and are used in various applications.

For a read-only optical disk, embossed pit trains are formed in spiral fashion, and information is reproduced by irradiating these pit trains with reproduction light and detecting the presence or absence of a pit and the pit length from a change in intensity of the reflected light.

For a recording/reproducing optical disk, grooves or grooves and pits are formed in spiral fashion. Addresses are formed in some way on the grooves or the grooves and pits. The addresses are used to determine the position for recording/reproducing. There are two recording systems for the recording/reproducing optical disk: one system allows information to be recorded on either grooves or lands, and the other system allows information to be recorded on both grooves and lands. The groove width and the space between the grooves differ depending on the recording system. Recording or reproduction is performed by forming a recording mark in a recording layer provided on the grooves or the lands. In the case of a phase change optical disk, e.g., a phase change recording layer is used as the recording layer. The phase change recording layer is made of a material whose refractive index with respect to the recording/reproducing light varies according to phase. The phase change can be achieved in such a manner that the time and intensity of irradiation during recording/reproducing are varied to cause a change in cooling rate of the recording layer. When the recording/reproducing optical disk includes the phase change recording layer, the phase change recording layer can be formed, e.g., in the grooves, and information is recorded/reproduced by forming marks with different phases in the phase change recording layer.

The capacity of optical disks increases steadily from about 650 MB (CD) to about 5 GB (DVD) with a rise in the market demand and the amount of information. In particular, the recording/reproducing optical disks are expected to substitute for tape media, and DVD-RAM already has achieved a capacity of about 5 GB. The capacity of about 5 GB enables recording for approximately two hours at an average transfer rate of about 5 Mbps. The average transfer rate of about 5 Mbps corresponds substantially to normal quality images in a compressed format called MPEG2. The market now demands optical disks that can record images with higher quality and definition for approximately two hours. The capacity can be increased, e.g., by forming multi-layer optical disks, improving recording areal density, and enhancing format efficiency. Concerning the recording areal density, DVD-RAM has attained a track pitch of about 0.615 μm and a minimum mark length of 0.42 μm.

An improvement in areal density for large capacity requires even narrower track pitch and shorter mark length. To record images with high quality and high definition for two or more hours, a capacity of about 25 GB is necessary, which is five times as large as the DVD. Therefore, the spot size of a beam for reproduction should be reduced to 0.44 times or less. Moreover, a minimum pit length of about 0.18 μm or less and a track pitch of about 0.35 μm or less in terms of DVD are needed to follow the reduced spot size.

The amplitude of a push-pull tracking error signal decreases with a decrease in track pitch. Therefore, when the track pitch becomes narrower as described above, the push-pull tracking error signal decreases sharply. This makes it difficult to perform tracking servo. Even if the tracking servo is performed, it is prone to deviate from its proper operation. Thus, strict track pitch accuracy is essential for a decrease in track pitch.

Figure 8:
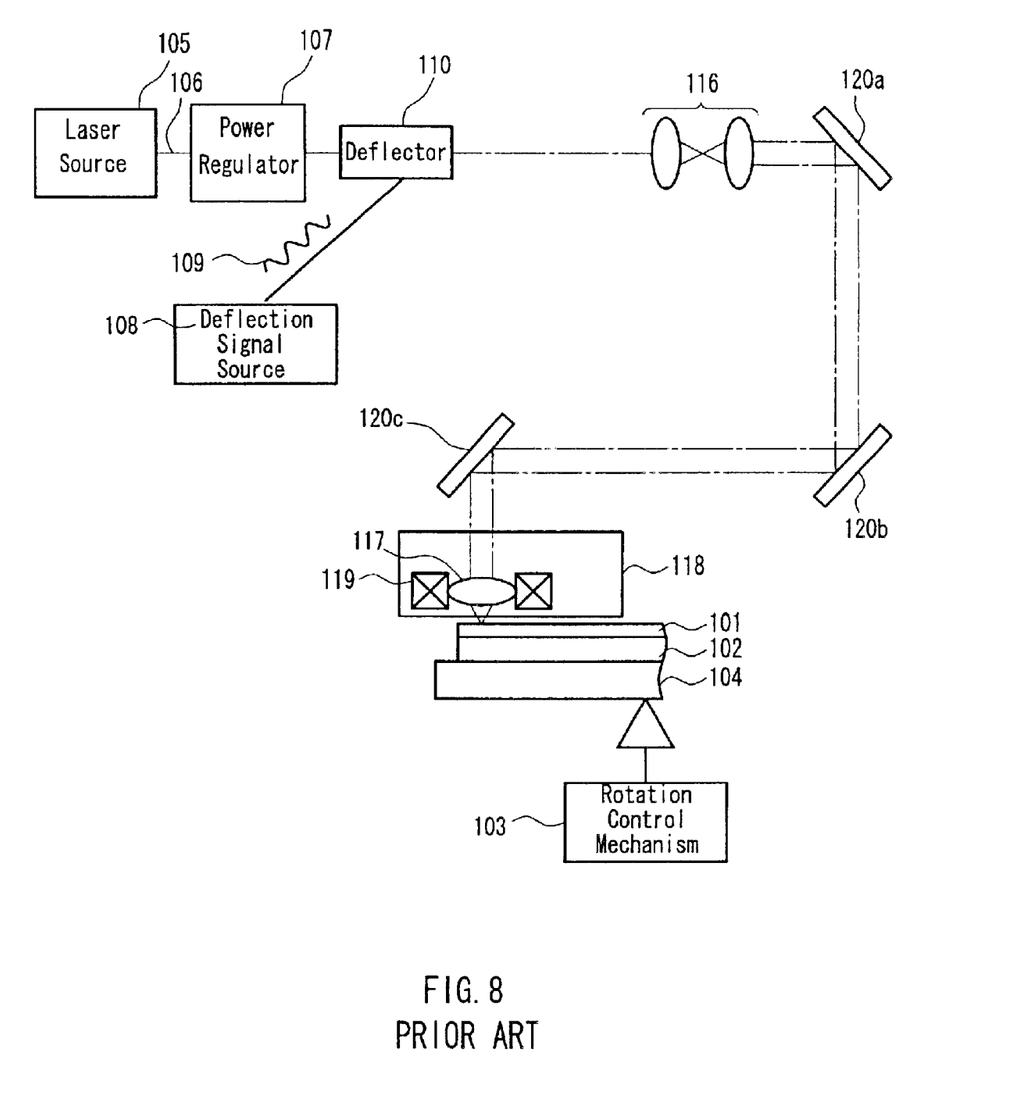
FIG. 8 is a block diagram showing a conventional optical disk master exposing apparatus.

FIG. 8 shows a conventional optical disk master exposing apparatus. A substrate disk 102 made of glass and coated with a photoresist 101 is exposed so as to produce an optical disk master. The substrate disk 102 is supported by a turntable 104 having a rotation control mechanism 103.

A light beam 106 emitted from a laser source 105 is incident on a power regulator 107, where the power of the laser beam 106 is adjusted. Then, a deflector 110 including an acoustooptical element deflects the laser beam 106 based on a deflection signal 109 output from a deflection signal source 108. The deflection is performed with the deflector 110 to form wobbled grooves for generating a reproduction clock. The deflected laser beam 106 is incident on an expander 116, where the beam diameter is expanded, passes through mirrors 120a, 120b, and 120c, and is focused on the photoresist 101 on the substrate disk 102 through an objective lens 117. The objective lens 117 is transferred in the radial direction of the substrate disk 102 by a transfer mechanism 118. The distance between the objective lens 117 and the substrate disk 102 is kept constant by a focusing control mechanism 119.

In this apparatus, the laser beam 106 fluctuates due to the optical elements arranged on the optical path of the laser beam 106, which degrades the pitch accuracy of tracks formed on the substrate disk 102. Moreover, there is also a limit to the track pitch accuracy because the transfer accuracy of the transfer mechanism 118 is limited.

Conventional techniques have never recognized such a track pitch accuracy limitation as a problem. However, when the track pitch is decreased to the extent described above, the track pitch accuracy significantly affects the tracking servo. Thus, it becomes very important to suppress degradation of the track pitch accuracy in pursuing a narrower track pitch.

SUMMARY OF THE INVENTION

Therefore, with the foregoing in mind, it is an object of the present invention to provide a method and apparatus for exposing an optical disk master that can improve the track pitch accuracy beyond a conventional limit.

A method for exposing an optical disk master of the present invention includes rotating a substrate disk coated with a photoresist, focusing a beam on the photoresist for exposure through an objective lens; and exposing the photoresist so as to form tracks on the substrate disk in its circumferential direction. At this time, the beam is deflected at least temporarily by passing through a deflector.

A first exposure method of the present invention is characterized in that the beam is divided into a first beam and a second beam after passing through the deflector, the first beam is focused on the photoresist, a difference between the current position and the target position of an optical path of the second beam is detected, and the deflection operation of the deflector is corrected based on the difference so that the optical path of the second beam is located at the target position.

According to this method, a deflector, with which wobbled grooves for generating a reproduction clock are formed, is used to correct beam fluctuation caused by the optical elements arranged on the optical path to the substrate disk, and thus the track pitch accuracy can be improved.

A second exposure method of the present invention is characterized in that a difference between the current value and the target value of a distance between the centers of the objective lens and the substrate disk is detected, and the deflection operation of the deflector is corrected based on the difference so that the beam is incident on a target position on the substrate disk.

According to this method, a transfer error of the objective lens relative to the substrate disk is corrected by deflection of the beam, and thus the track pitch accuracy can be improved beyond a mechanism limit.

In this method, it is preferable that the positional deviation of the substrate disk from a normal position in the direction of movement of the objective lens is detected, and the difference is corrected based on the detection result. This can suppress the effect of the positional deviation of the substrate disk on the track pitch accuracy.

A third exposure method of the present invention is characterized in that a far ultraviolet laser beam is used as the beam, and a deflector including an electrooptical element is used as the deflector.

This method can suppress the fluctuation of a laser beam emitted from the deflector in a sufficiently small range even with a narrow track pitch, thereby improving the track pitch accuracy and stabilizing the tracking servo. This method is effective particularly when the track pitch is 0.35 $\mu$m or less.

In this method, it is preferable that a modulator using an acoustooptical element modulates the laser beam before being incident on the deflector so that a direction of zero-order to first-order light is parallel to the tracks. This configuration allows the laser beam fluctuation caused in the modulator to orient in the direction of recording tracks that is irrelevant to the track pitch accuracy.

Each apparatus for exposing an optical disk master of the present invention is used to carry out the invention of each of the above exposure methods, and has the corresponding characteristic and effect. The basic configuration common to the apparatuses includes the following: a turntable for rotating a substrate disk coated with a photoresist; a beam source for emitting a beam for exposing the photoresist; a deflector for deflecting the beam; a deflection signal source for supplying the deflector with a deflection signal used to deflect the beam; an objective lens for focusing the beam transmitted by the deflector on the photoresist; and a transfer mechanism for transferring the beam in a radial direction of the substrate disk. The apparatuses perform exposure so as to form tracks on the substrate disk in its circumferential direction.

A first exposing apparatus of the present invention further includes the following: a beam splitter for dividing the beam transmitted by the deflector into a first beam and a second beam; a beam position difference detector for detecting a difference between the current position and the target position of an optical path of the second beam; and a deflection signal corrector for correcting the deflection signal based on a signal output from the beam position difference detector so that the optical path of the second beam is located at the target position. The first beam is guided through an optical path to the objective lens.

A second exposing apparatus of the present invention further includes a center distance difference detector for detecting a difference between the current value and the target value of a distance between the centers of the objective lens and the substrate disk, and a deflection signal corrector for correcting the deflection signal based on a signal output from the center distance difference detector so that the beam is incident on a target position on the substrate disk.

In this apparatus, it is preferable that the apparatus further includes a turntable positional deviation detector that detects positional deviation of the turntable from a normal position in the direction of movement of the objective lens and supplies the detection result to the center distance difference detector, and the center distance difference detector corrects the difference based on an output from the turntable positional deviation detector.

A third exposing apparatus is characterized in that a far ultraviolet source is used as the beam source, and a deflector including an electrooptical element is used as the deflector.

It is preferable that this configuration further includes a modulator using an acoustooptical element through which the beam passes before being incident on the deflector, and the modulator modulates the beam so that a direction of zero-order to first-order light is parallel to the tracks.

DESCRIPTION OF THE PREFERRED EMBODIMENTS

Hereinafter, embodiments of the present invention will be described in detail with reference to the drawings.

Embodiment 1

Figure 1:
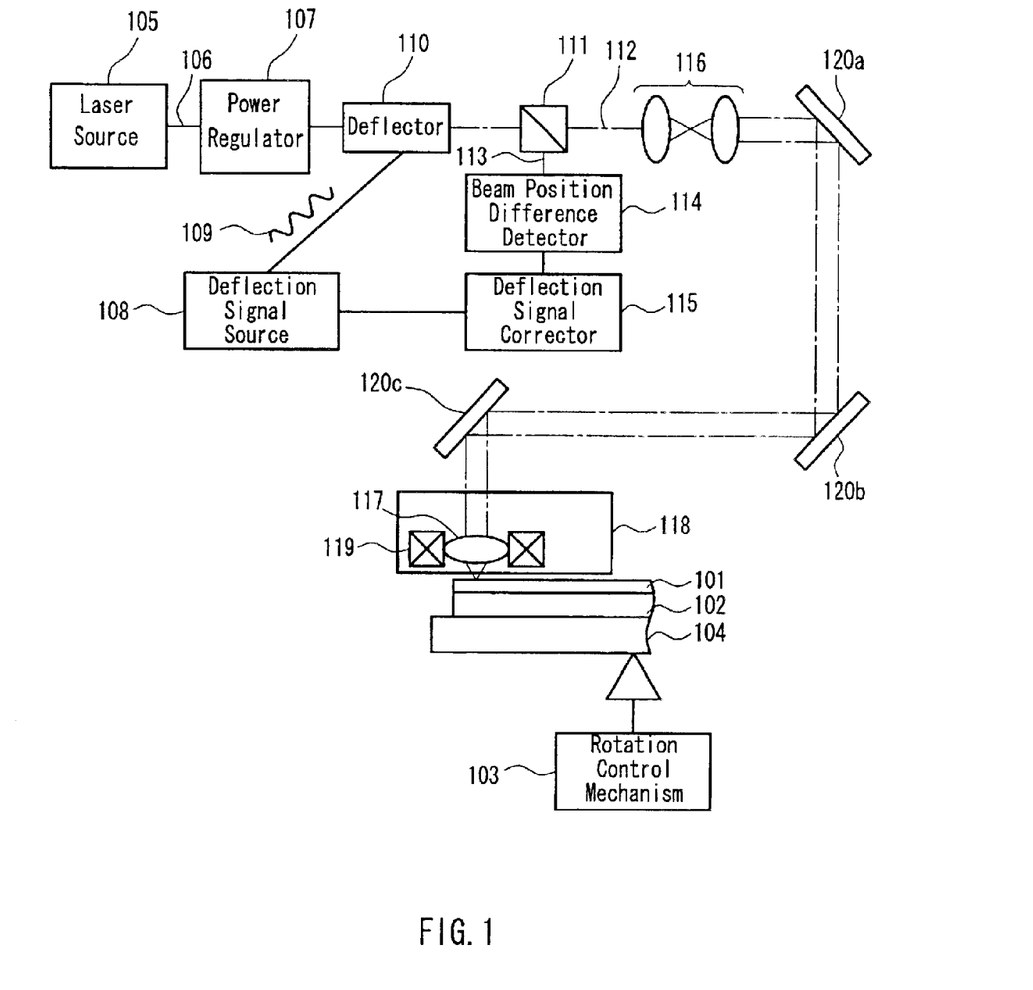
FIG. 1 is a block diagram showing an optical disk master exposing apparatus according to Embodiment 1 of the present invention.

FIG. 1 is a block diagram showing an optical disk master exposing apparatus of Embodiment 1. This embodiment describes the optical disk master exposing apparatus using a laser beam.

In the exposing apparatus illustrated in FIG. 1, a turntable 104 for supporting a substrate disk 102, a transfer mechanism 118 for driving an objective lens 117, and a focusing control mechanism 119 are the same as those in FIG. 8. The configuration of an optical system that includes a laser source 105, a power regulator 107, a deflector 110, and an expander 116 also is the same. Therefore, the elements related to the conventional example are denoted by the same reference numerals, and the explanation of each element will not be repeated.

The exposing apparatus further includes a beam splitter 111 that divides a laser beam 106 transmitted by the deflector 110 into a first laser beam 112 and a second laser beam 113. Like the conventional example, the first laser beam 112 is incident on the expander 116. The second laser beam 113 is incident on a beam position difference detector 114. The beam position difference detector 114 detects a difference between the current position and the target position of the optical path of the second laser beam 113 and outputs the detection result to a deflection signal corrector 115. Based on the signal that represents a positional difference of the second laser beam 113 with respect to the target position, the deflection signal corrector 115 outputs a signal for correcting a deflection signal 109 to a deflection signal source 108.

A laser that employs SHG (second harmonic generation) of an Ar ion laser may be used as the laser source 105. The laser source 105 emits the laser beam 106 having a wavelength of 248 nm. A groove formed on the substrate disk 102 depends on the spot size of the focused laser beam 112, and the spot size is proportional to wavelength and inversely proportional to NA. Therefore, even if the groove pitch is reduced to about 0.35 $\mu$m to achieve a higher density, the groove can be formed under the conditions that the laser wavelength is 248 nm and the NA of the objective lens is 0.9.

The deflector 110 deflects the laser beam 106 so that the amount of deflection of a sine wave having a period of about 10 $\mu$m is approximately several tens nm P–P on the substrate disk 102. When the magnification of the expander is 5 times and the focal length of the objective lens 117 is 2 mm, the laser beam should be deflected at angles of several tens to several hundreds $\mu$rad P–P to achieve the amount of deflection of several tens nm P–P. The period of the sine wave depends on the length of a mark for recording/reproducing, and the amount of deflection depends on a reproduction wobble C/N in reproducing a groove. The deflection is performed to form grooves that include addresses, in addition to a simple sine wave. In this case, a wobbling method can be changed according to the address structure.

Like the laser beam 106 in the conventional example, the first laser beam 112 is used for exposing the photoresist 101 on the substrate disk 102. The first laser beam 112 is expanded to the pupil diameter of the objective lens 117 with the expander 116. By increasing the beam diameter, the NA of the objective lens 117 can be utilized sufficiently, so that the focused laser beam can have a minimum spot size.

The second laser beam 113 is used to correct the optical path of the first laser beam 112. There is a predetermined positional relationship between the optical paths of the second laser beam 113 and the laser beam 106, i.e., the first laser beam 112. Therefore, a difference between the current position and the target position of the optical path of the first laser beam 112 can be detected indirectly with the beam position difference detector 114 based on the optical path of the second laser beam 113.

The output of the beam position difference detector 114 is set to recognize the correlation between the incident position of the second laser beam 113 and the target position. Thus, it is possible to detect a signal that represents a difference between the current incident position of the second laser beam 113 and the target position. Specific examples of the beam position difference detector 114 include a device such as PSD (position sensitive detector). Using the PSD, a difference between the target position preset on the PSD and the current incident position is calculated, and the deflection signal corrector 115 corrects the deflection signal 109 based on the detected difference.

It is not necessary to clearly distinguish the beam position difference detector 114 from the deflection signal corrector 115. That is, among the functions of the whole exposing apparatus, the element (or the combination of the elements) that serves to detect a difference between the current position of the second laser beam 113 and the target position is defined as the beam position difference detector 114.

The transfer mechanism 118 transfers the objective lens 117 along the surface of the substrate disk 102 from the inner peripheral side to the outer peripheral side, and vice versa. The turntable 104 carrying the substrate disk 102 rotates in accordance with the movement of the objective lens 117. In this example, the objective lens 117 is transferred, but the substrate disk 102 and the turntable 104 can be transferred as well. The number of revolutions of the turntable 104 is controlled by the rotation control mechanism 103 according to the recording method, such as recording with constant linear velocity or recording with constant zone angular velocity. The power regulator 107 controls the laser power. During exposure, the focusing control mechanism 119 maintains the distance between the objective lens 117 and the substrate disk 102 constant. These control operations enable spiral exposure recording on the substrate disk 102.

In the conventional exposing apparatus shown in FIG. 8, the fluctuation of the laser beam 106 caused between the laser source 105 and the deflector 110 directly affects the track pitch of the substrate disk 102. In contrast, this embodiment can correct the laser beam fluctuation caused in the optical path before reaching the beam splitter 111. Therefore, the track pitch accuracy of this embodiment can be improved to ±20 nm P—P as compared with ±30 nm P—P for the conventional track pitch accuracy. In the above explanation, the exposing apparatus does not include a modulator, so that modulation is not performed. However, the present invention can be applied to an apparatus that includes a modulator and performs modulation with the modulator.

Figure 2:
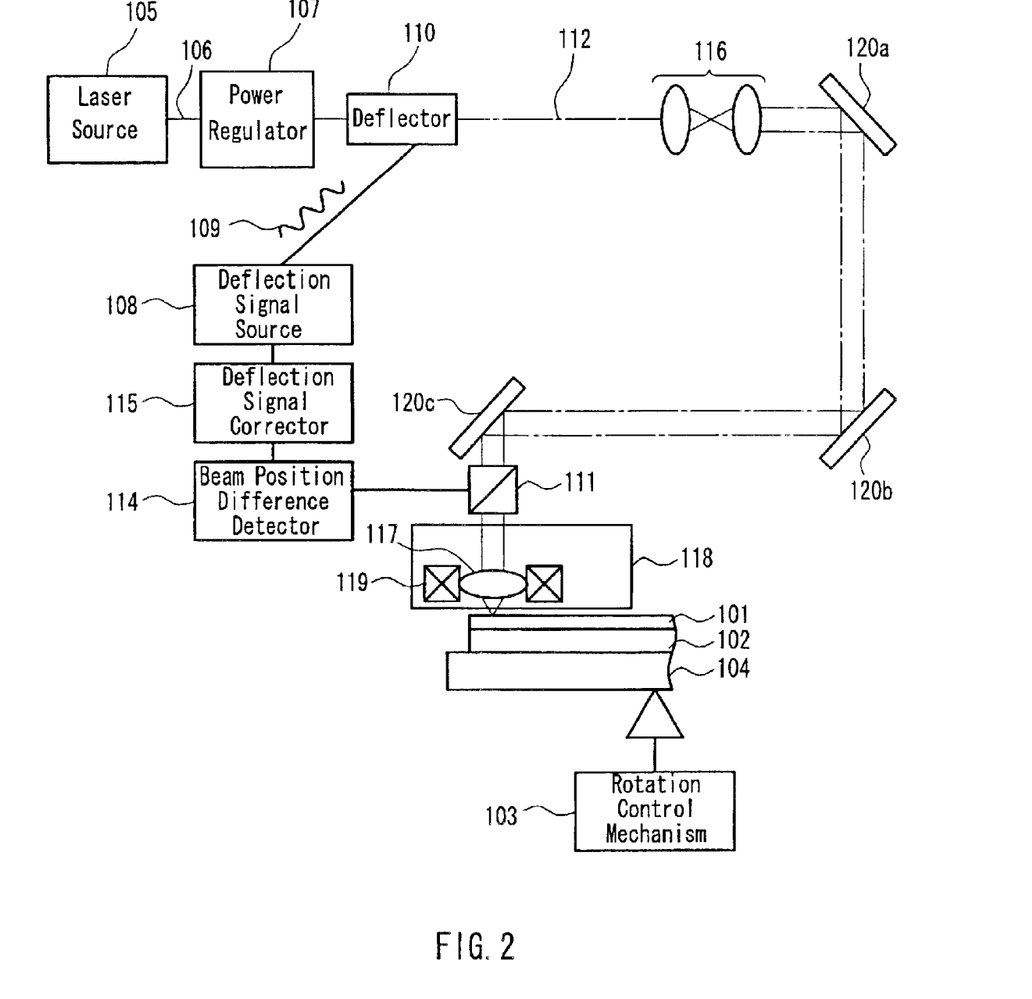
FIG. 2 is a block diagram showing another example of an optical disk master exposing apparatus according to Embodiment 1.

The beam splitter 111 may be located at any position, e.g., upstream from the deflector 110. This can be the same when a modulator is used. FIG. 2 shows an exposing apparatus in which the beam splitter 111 is arranged between the mirror 120c and the objective lens 117. In this case, the fluctuation of the laser beam caused in the entire optical path before reaching the objective lens 117 can be corrected. Therefore, this configuration is very effective in improving the track pitch accuracy.

The space between grooves is not limited to about 0.35 $\mu$m as described above, and the present invention can be applied without depending on the track pitch. However, the effect of the present invention increases with a decrease in track pitch.

Embodiment 2

Figure 3:
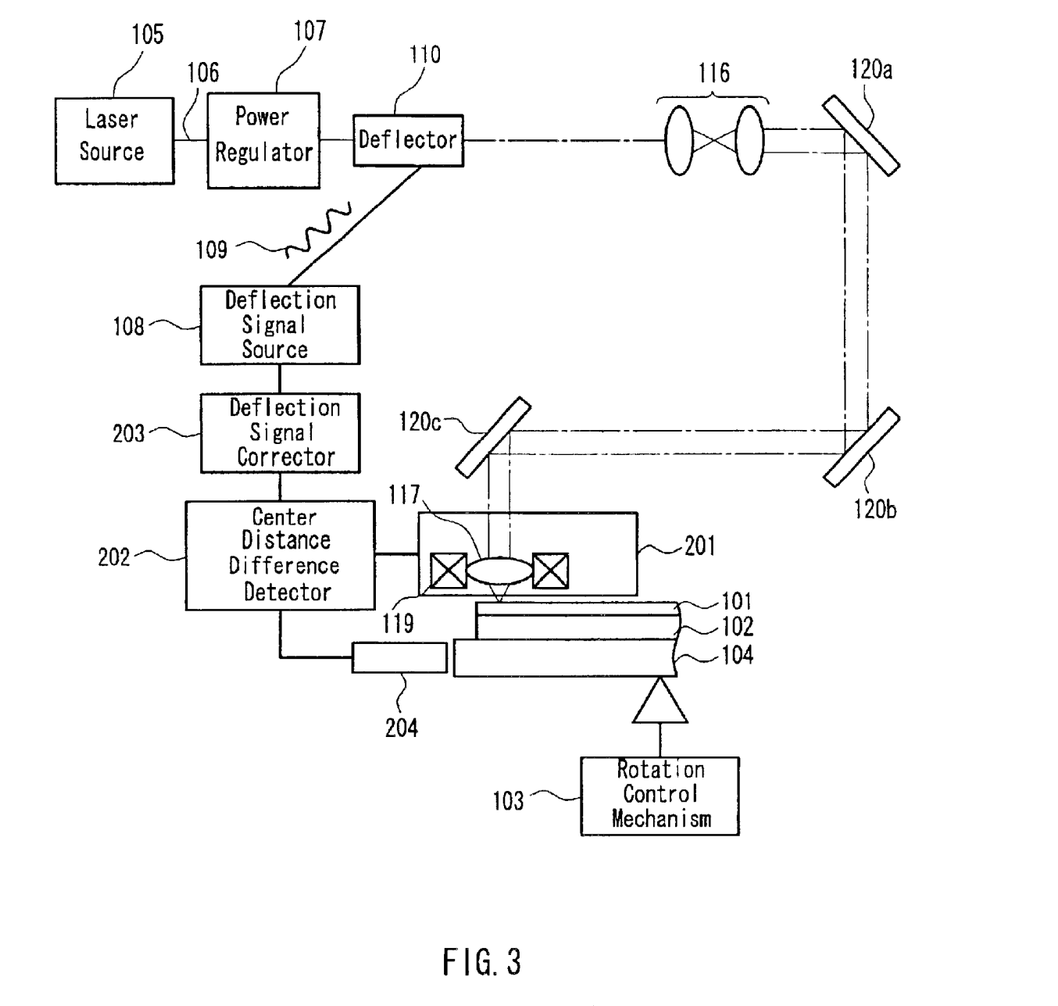
FIG. 3 is a block diagram showing an optical disk master exposing apparatus according to Embodiment 2.

FIG. 3 is a block diagram showing an optical disk master exposing apparatus of Embodiment 2. This embodiment differs from Embodiment 1 in that the track pitch accuracy is improved by correcting the displacement component caused by a mechanical structure instead of that caused by the fluctuation of a laser beam.

In the exposing apparatus illustrated in FIG. 3, a turntable 104 for supporting a substrate disk 102 and a focusing control mechanism 119 for driving an objective lens 117 are the same as those in FIG. 8. The configuration of an optical system that includes a laser source 105, a power regulator 107, a deflector 110, and an expander 116 also is the same. Therefore, the elements related to the conventional example are denoted by the same reference numerals, and the explanation of each element will not be repeated.

In this apparatus, a deflection signal 109 output from a deflection signal source 108 is corrected by a center distance difference detector 202 and a deflection signal corrector 203. Moreover, the apparatus includes a turntable positional deviation detector 204, whose output is used to compensate the output of the center distance difference detector 202.

In the process of exposure, the objective lens 117 is transferred in a radial direction according to the revolution of the turntable 104, and thus a laser beam 106 travels radially on the substrate disk 102. To produce appropriate tracks, a predetermined relationship should be maintained between a transfer distance of the objective lens 117 and the number of revolutions of the turntable 104. Therefore, the objective lens 117 is transferred with high precision so that a distance between the centers of the objective lens 117 and the substrate disk 102 matches a target value that corresponds to the elapsed time from the beginning of exposure. However, even a small error of the transfer distance cannot be ignored when the track pitch accuracy becomes extremely high, as described above. Thus, this embodiment performs the following control operations to ensure that the laser beam 106 traveling in the radial direction of the substrate disk 102 always is incident on an appropriate position on the substrate disk 102.

The transfer mechanism 201 detects the current position of the objective lens 117 while transferring it in the radial direction of the substrate disk 102 from the inner peripheral side to the outer peripheral side, and vice versa. The detection signal is then input to the center distance difference detector 202. Based on the correspondence between a detection signal of the preset position of the objective lens 117 and the center position of the substrate disk 102, the center distance difference detector 202 detects a difference between the current value and the target value of a distance between the centers of the objective lens 117 and the substrate disk 102. The deflection signal corrector 203 receives the resultant difference signal and outputs a signal for correcting the deflection signal 109 to the deflection signal source 108. The deflector 110 deflects the laser beam 106 based on the deflection signal 109 thus corrected, so that the deviation of the incident position of the laser beam 106 from the appropriate position on the substrate disk 102 can be corrected.

Figure 4A:
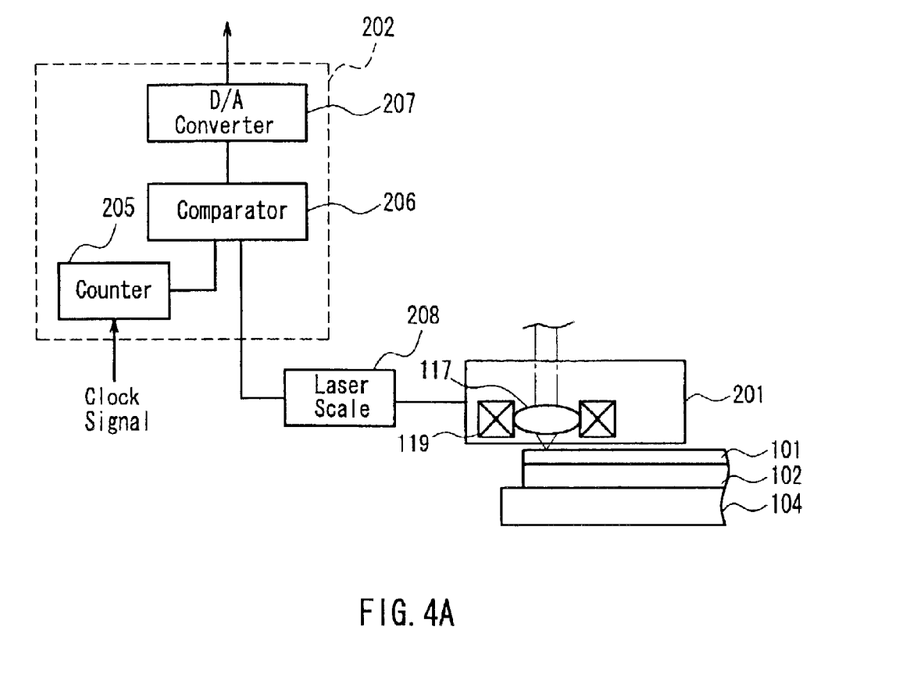
FIG. 4A is a block diagram showing a specific example of the configuration of a part of the optical disk master exposing apparatus in FIG. 3.
Figure 4B:
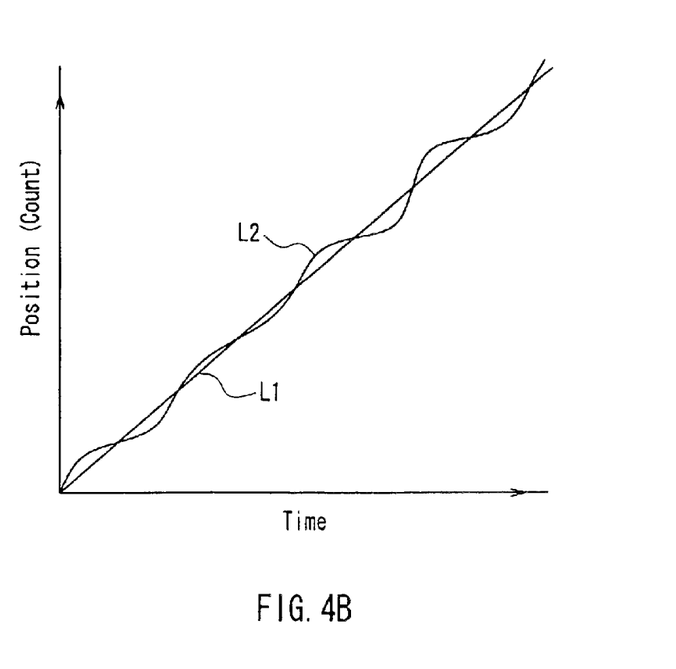
FIG. 4B shows the operation of an optical disk master exposing apparatus having the configuration in FIG. 4A.

In the system, e.g., in which the objective lens 117 is transferred and the substrate disk 102 is rotated, a distance between the centers can be detected by measuring the transferred position of the objective lens 117 with a laser scale or the like. Referring to FIGS. 4A and 4B, an example of the configuration of the center distance difference detector 202, when the laser scale is used to measure the transferred position of the objective lens 117, will be described in the following.

In FIG. 4A, a laser scale 208 is located near the transfer mechanism 201 and detects the position of the objective lens 117. The center distance difference detector 202 includes a counter 205, a comparator 206, and a D/A converter 207. The counter 205 receives a clock signal and starts counting at the beginning of exposure. The comparator 206 receives two outputs: one from the counter 205, and the other from the laser scale 208. The output from the comparator 206 is converted with the D/A converter 207 and then output from the center distance difference detector 202.

The output of the counter 205 is set to have a predetermined relationship with the output of the laser scale 208. In other words, the output of the counter 205 matches a target value of a distance between the centers of the objective lens 117 and the substrate disk 102 that corresponds to the elapsed time from the beginning of exposure. The output of the counter 205 is indicated by a line L1 in FIG. 4B. If the objective lens 117 is located at an appropriate position, the output of the laser scale 208 matches the line L1. Actually, however, the output of the laser scale 208 is indicated by a curve L2 in FIG. 4B because of errors. Since L1 and L2 are digital values, they in fact should be represented by a step-shaped graph. For easier understanding, FIG. 4B shows L1 and L2 as analog values. A difference between L1 and L2 at each point of time on the horizontal axis in FIG. 4B indicates a difference between the current value and the target value of a distance between the centers of the objective lens 117 and the substrate disk 102 when track wobbling is not taken into consideration.

The turntable positional deviation detector 204 in the configuration shown in FIG. 3 measures the positional deviation of the turntable 104 in the direction of movement of the objective lens 117. The positional deviation is an error component of the position of the objective lens 117 relative to the substrate disk 102. Therefore, to achieve a further improvement in track pitch accuracy, the output of the turntable positional deviation detector 204 is input to the center distance difference detector 202 and used for correcting the difference signal. The turntable positional deviation detector 204 can be formed, e.g., with a capacitance sensor.

As described above, the number of revolutions of the turntable 104 is controlled by the rotation control mechanism 103 according to the recording method, such as recording with constant linear velocity or recording with constant zone angular velocity, while correcting the deviation of the incident position of the laser beam 106 on the substrate disk 102. Moreover, the power regulator 107 controls the laser power. These control operations enable spiral exposure recording on the substrate disk 102.

A distance between the centers of the objective lens 117 and the substrate disk 102 means the relationship of the distance between the two elements, and thus it is not necessarily required to detect a distance between the centers directly. That is, to indirectly specify the incident position of the laser beam 106 on the substrate disk 102, the distance relationship between the objective lens 117 and the substrate disk 102 may be detected in some way. The substrate disk 102 can be transferred instead of the objective lens 117. In that case, the position of the substrate disk 102 is measured to detect a distance between the centers of the substrate disk 102 and the fixed objective lens 117.

This embodiment can improve the track pitch accuracy as follows. Compared with a conventional track pitch accuracy of ±30 nm P—P, the track pitch accuracy of this embodiment is reduced by half to ±15 nm P—P. This embodiment can achieve the track pitch accuracy beyond a mechanism limit by deflecting a laser beam.

In this embodiment, the apparatus does not include a modulator, so that modulation is not performed. However, the present invention can be applied to an apparatus that includes a modulator and performs modulation with the modulator. The present invention also can be applied to exposure that uses an electron beam instead of the laser source 105. In that case, the expander 116 is unnecessary, and a silicon substrate or the like instead of a glass substrate can be used as the substrate disk.

Embodiment 3

Figure 5:
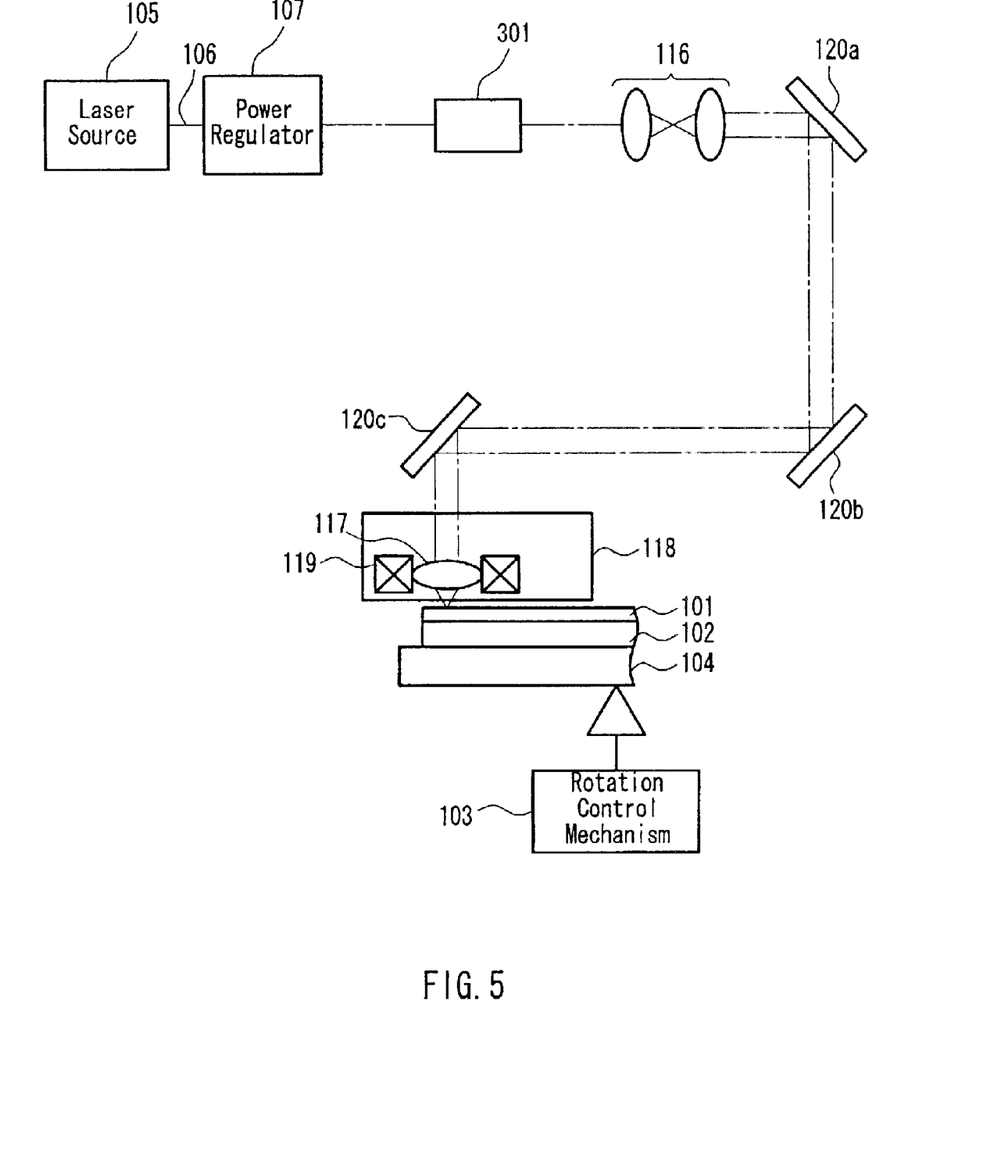
FIG. 5 is a block diagram showing an optical disk master exposing apparatus according to Embodiment 3.

FIG. 5 is a block diagram showing an optical disk master exposing apparatus of Embodiment 3. This exposing apparatus is formed of the same combination of elements as that shown in FIG. 8. Therefore, the elements related to the conventional example are denoted by the same reference numerals, and the explanation of each element will not be repeated.

In this embodiment, a far ultraviolet laser source 105 is used, and an electrooptical element is used as a deflector 301 instead of a conventional acoustooptical element.

The deflector including a conventional acoustooptical element causes drive-frequency fluctuations. This makes the deflection direction unstable, and a laser beam emitted from the deflector fluctuates, resulting in degradation of the track pitch accuracy. The laser beam fluctuation increases with a decrease in track pitch, which in turn increases fluctuations in the push-pull tracking error signal. In the deflector 301 that utilizes the electrooptical effect, the fluctuation of a laser beam is small, so that it is possible to suppress the fluctuation into a sufficiently small range even with a narrow track pitch.

Thus, the deflector 301 including an electrooptical element is suitable particularly for a track pitch of about 0.35 µm or less on the substrate disk. For a recording system that allows information to be recorded on either grooves or lands, a track pitch of about 0.35 µm or less corresponds to an optical disk having a capacity of about 25 GB or more per layer.

Figure 6:
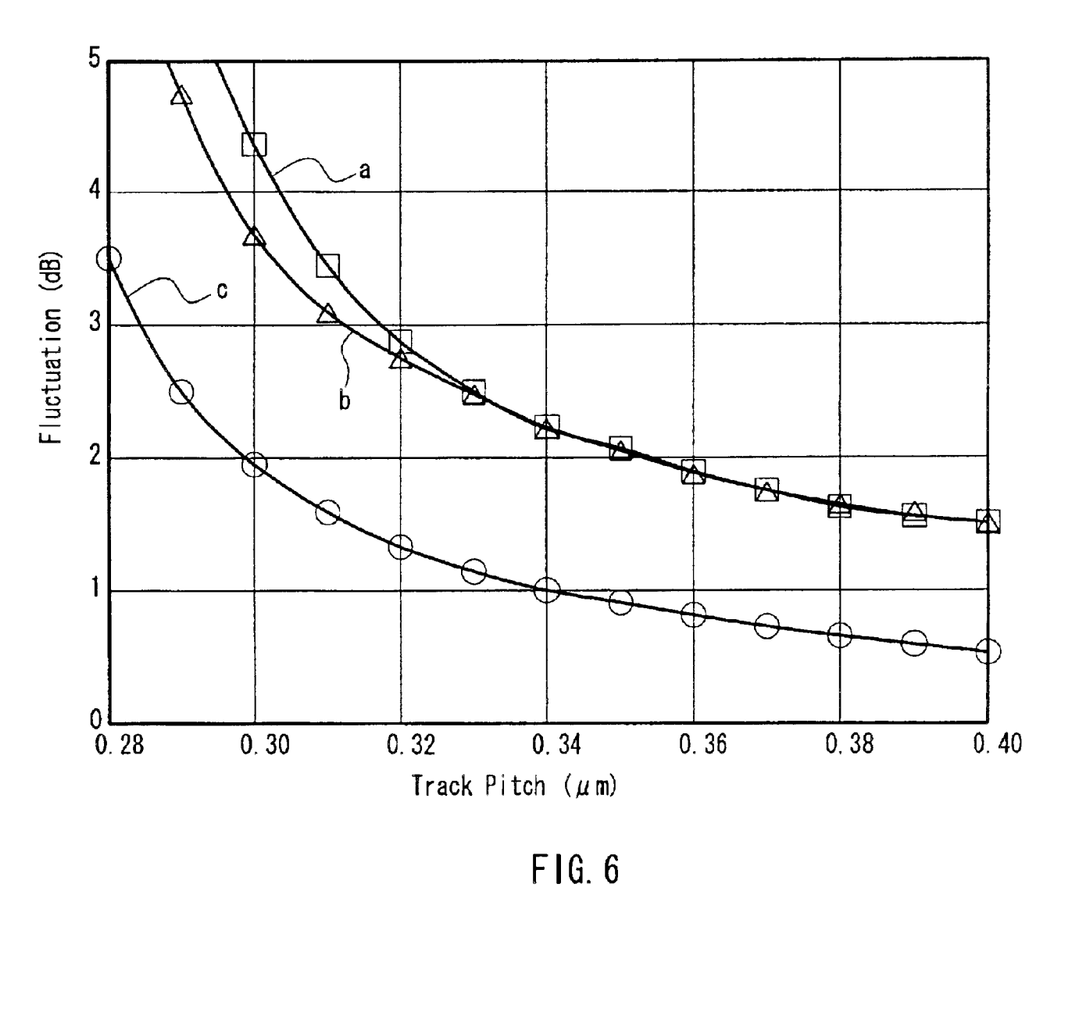
FIG. 6 shows the relationship between a track pitch and fluctuations in push-pull tracking error signal.

FIG. 6 shows the relationship between a track pitch and fluctuations in push-pull tracking error signal. In this example, the recording system for recording information on either grooves or lands was employed, and the depth of a groove was 22 nm. The measurement was carried out with a reproduction optical system under the conditions that the wavelength was 405 nm and the NA of the objective lens was 0.85. A curve "a" indicates a deflector A including an acoustooptical element, a curve "b" indicates a deflector B including an acoustooptical element, and a curve "c" indicates a deflector C including an electrooptical element. The drive frequency of the deflector A is 400 MHz and that of the deflector B is 200 MHz.

Both of the deflectors A, B have fluctuations more than 2 dB when the track pitch is 0.35 µm or less. For such fluctuations of more than 2 dB, the tracking servo becomes unstable or cannot be performed. When the track pitch is about 0.62 µm, as is the case in the conventional example, the fluctuations are small. Thus, it can be seen that there is a great influence resulting from a narrow track pitch. Namely, tracking does not function well with the conventional deflector including an acoustooptical element, when the track pitch is decreased to 0.35 µm or less in order to achieve larger capacity and higher density.

As described above, the fluctuation of a push-pull tracking error signal should be 2 dB or less, and thus the tracking pitch accuracy should be sufficiently high. When the fluctuation is not more than 2 dB, the tracking servo can be performed stably even if the capacity and density are increased. Thus, it is possible to achieve the same level of tracking servo as that of DVD. This embodiment can suppress the amplitude fluctuation of the push-pull tracking error signal by using the deflector that utilizes the electrooptical effect. Therefore, even if the track pitch is decreased, stable tracking servo can be achieved.

Embodiment 4

Figure 7:
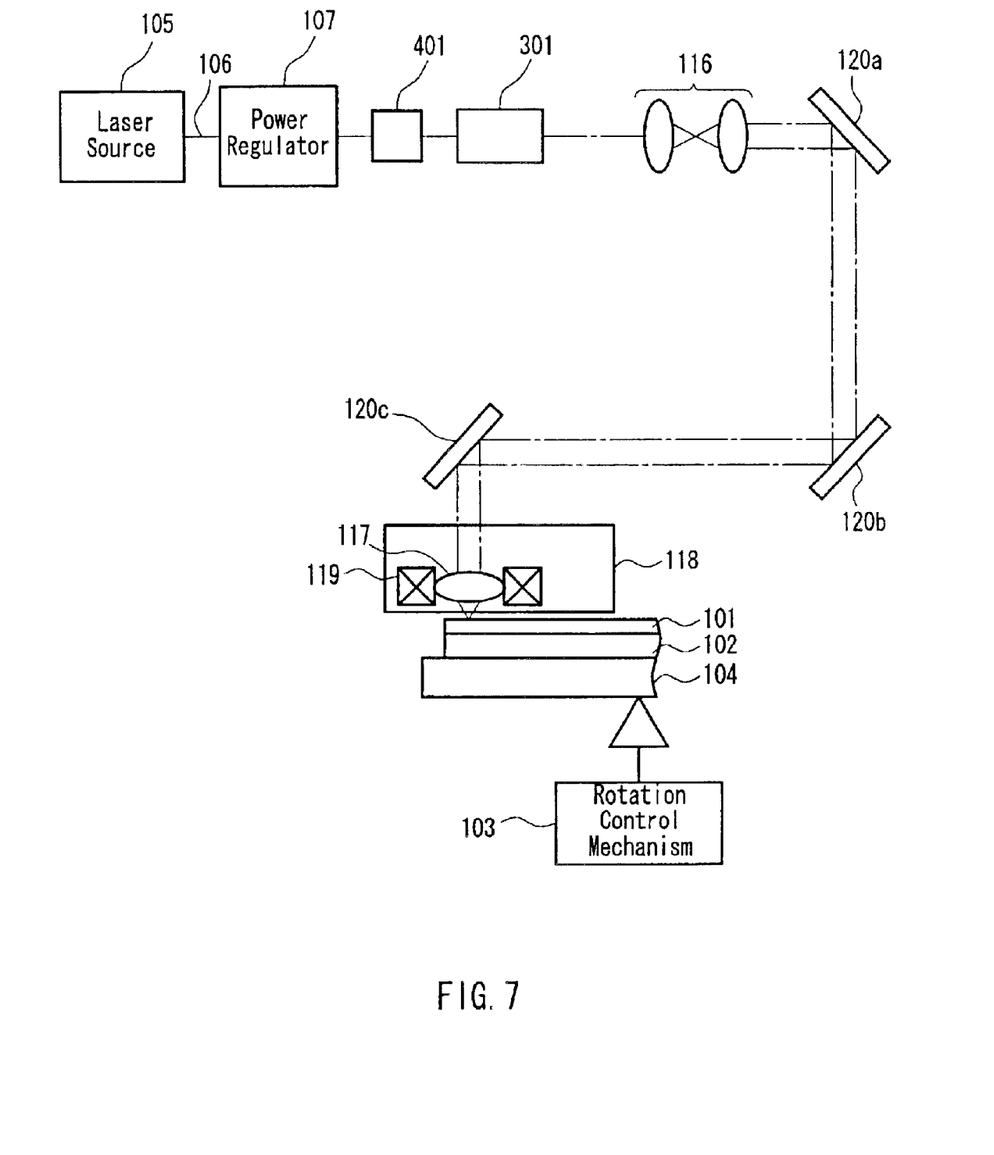
FIG. 7 is a block diagram showing an optical disk master exposing apparatus according to Embodiment 4.

FIG. 7 is a block diagram showing an optical disk master exposing apparatus of Embodiment 4. This exposing apparatus has the configuration in which a modulator 401 is added to the apparatus of Embodiment 3 shown in FIG. 6.

A laser beam 106 passes through a power regulator 107 and is modulated by the modulator 401. A modulator including an acoustooptical element is used as the modulator 401. The reason for this is as follows. The modulator including an electrooptical element instead of an acoustooptical element requires extra power for bias control. Moreover, a detector becomes less sensitive to light having a wavelength of 300 nm or less, so that it is necessary to increase the power assigned to the bias control. This leads to a reduction in transmittance of the whole apparatus. However, the modulator 401 does not have such disadvantage because it uses an acoustooptical element.

The modulator 401 is installed so that the direction of zero-order to first-order light emitted from the modulator 401 is parallel to the recording tracks. This can eliminate the effect of the zero-order to first-order light on the track pitch accuracy.

In the conventional apparatus that uses an acoustooptical element for deflection, the direction of the zero-order to first-order light of the modulator is parallel to the deflection direction. Therefore, the beam fluctuation caused in the modulator is a direct factor of the track pitch fluctuation. However, this embodiment uses the deflector 301 including an electrooptical element for deflection, thereby making the direction of the beam fluctuation in the modulator parallel to the recording tracks and preventing degradation of the track pitch accuracy. Consequently, fluctuations of the push-pull tracking error signal can be suppressed, and thus appropriate tracking servo can operate even with a narrow track pitch.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for exposing an optical disk master comprising:

rotating a substrate disk coated with a photoresist;

focusing a beam on the photoresist for exposure through an objective lens; and exposing the photoresist so as to form tracks on the substrate disk in its circumferential direction, the beam being deflected at least temporarily by passing through a deflector;

wherein the beam is divided into a first beam and a second beam after passing through the deflector, the first beam is focused on the photoresist, a difference between a current position and a target position of an optical path of the second beam is detected, and the deflection operation of the deflector is corrected based on the difference so that the optical path of the second beam is located at the target position.

2. A method for exposing an optical disk master comprising:

rotating a substrate disk coated with a photoresist;

focusing a beam on the photoresist for exposure through an objective lens; and exposing the photoresist so as to form tracks on the substrate disk in its circumferential direction, the beam being deflected at least temporarily by passing through a deflector;

wherein a difference between a current value and a target value of a distance between centers of the objective lens and the substrate disk is detected, and the deflection operation of the deflector is corrected based on the difference so that the beam is incident on a target position on the substrate disk.

3. The method according to claim 2, wherein positional deviation of the substrate disk from a normal position in a direction of movement of the objective lens is detected, and the difference is corrected based on the detection result.

4. A method for exposing an optical disk master comprising:

rotating a substrate disk coated with a photoresist;

focusing a beam on the photoresist for exposure through an objective lens; and exposing the photoresist so as to form tracks on the substrate disk in its circumferential direction, the beam being deflected at least temporarily by passing through a deflector;

wherein a far ultraviolet laser beam is used as the beam, and a deflector comprising an electrooptical element is used as the deflector.

5. The method according to claim 4, wherein a track pitch is about 0.35 μm or less.

6. The method according to claim 4, wherein a modulator using an acoustooptical element modulates the laser beam before being incident on the deflector so that a direction of zero-order to first-order light is parallel to the tracks.

7. The method according to claim 6, wherein a track pitch is about 0.35 μm or less.

8. An apparatus for exposing an optical disk master comprising:

a turntable for rotating a substrate disk coated with a photoresist;

a beam source for emitting a beam for exposing the photoresist;

a deflector for deflecting the beam;

a deflection signal source for supplying the deflector with a deflection signal used to deflect the beam;

an objective lens for focusing the beam transmitted by the deflector on the photoresist; and a transfer mechanism for transferring the beam in a radial direction of the substrate disk, the apparatus performing exposure so as to form tracks on the substrate disk in its circumferential direction, wherein the apparatus further comprises a beam splitter for dividing the beam transmitted by the deflector into a first beam and a second beam, a beam position difference detector for detecting a difference between a current position and a target position of an optical path of the second beam, and a deflection signal corrector for correcting the deflection signal based on a signal output from the beam position difference detector so that the optical path of the second beam is located at the target position, and wherein the first beam is guided through an optical path to the objective lens.

9. An apparatus for exposing an optical disk master comprising:

a turntable for rotating a substrate disk coated with a photoresist;

a beam source for emitting a beam for exposing the photoresist;

a deflector for deflecting the beam;

a deflection signal source for supplying the deflector with a deflection signal used to deflect the beam;

an objective lens for focusing the beam transmitted by the deflector on the photoresist; and a transfer mechanism for transferring the beam in a radial direction of the substrate disk, the apparatus performing exposure so as to form tracks on the substrate disk in its circumferential direction, wherein the apparatus further comprises a center distance difference detector for detecting a difference between a current value and a target value of a distance between centers of the objective lens and the substrate disk, and a deflection signal corrector for correcting the deflection signal based on a signal output from the center distance difference detector so that the beam is incident on a target position on the substrate disk.

10. The apparatus according to claim 9, wherein the apparatus further comprises a turntable positional deviation detector that detects positional deviation of the turntable from a normal position in a direction of movement of the objective lens and supplies the detection result to the center distance difference detector, and the center distance difference detector corrects the difference based on an output from the turntable positional deviation detector.

11. An apparatus for exposing an optical disk master comprising:

a turntable for rotating a substrate disk coated with a photoresist;

a beam source for emitting a beam for exposing the photoresist;

a deflector for deflecting the beam;

a deflection signal source for supplying the deflector with a deflection signal used to deflect the beam;

an objective lens for focusing the beam transmitted by the deflector on the photoresist; and a transfer mechanism for transferring the beam in a radial direction of the substrate disk, the apparatus performing exposure so as to form tracks on the substrate disk in its circumferential direction, wherein a far ultraviolet laser source is used as the beam source, and a deflector including an electrooptical element is used as the deflector.

12. The apparatus according to claim 11, wherein a track pitch is about 0.35 μm or less.

13. The apparatus according to claim 11, wherein the apparatus further comprises a modulator using an acoustooptical element through which the beam passes before being incident on the deflector, and the modulator modulates the beam so that a direction of zero-order to first-order light is parallel to the tracks.

14. The apparatus according to claim 13, wherein a track pitch is about 0.35 μm or less.

* * * * *